US011894634B2

(12) United States Patent
Kobayashi et al.

(10) Patent No.: US 11,894,634 B2
(45) Date of Patent: Feb. 6, 2024

(54) CONNECTOR

(71) Applicant: YAZAKI CORPORATION, Tokyo (JP)

(72) Inventors: Tooru Kobayashi, Makinohara (JP); Nobuyuki Mukoujima, Fujieda (JP)

(73) Assignee: YAZAKI CORPORATION, Tokyo (JP)

( * ) Notice: Subject to any disclaimer, the term of this patent is extended or adjusted under 35 U.S.C. 154(b) by 112 days.

(21) Appl. No.: 17/726,572

(22) Filed: Apr. 22, 2022

(65) Prior Publication Data

US 2022/0344860 A1 Oct. 27, 2022

(30) Foreign Application Priority Data

Apr. 22, 2021 (JP) ................................ 2021-072252

(51) Int. Cl.
*H01R 13/62* (2006.01)
*H01R 13/627* (2006.01)
*H01R 31/08* (2006.01)

(52) U.S. Cl.
CPC ......... *H01R 13/6272* (2013.01); *H01R 31/08* (2013.01)

(58) Field of Classification Search
CPC ...... H01R 13/436-4368; H01R 13/6271-6273
See application file for complete search history.

(56) References Cited

U.S. PATENT DOCUMENTS 5,252,096 A 10/1993 Okada
6,276,964 B1 8/2001 Shinozaki
9,022,813 B2 * 5/2015 Wilkner ............... H01R 13/514 439/701
9,331,419 B2 * 5/2016 Yagi ..................... H01R 13/514
2010/0136819 A1 6/2010 Mase et al.

FOREIGN PATENT DOCUMENTS

EP 0898330 A2 2/1999
EP 3913750 A1 11/2021
JP H07-249454 A 9/1995
JP 2000-243502 A 9/2000
JP 2001-357923 A 12/2001
JP 2002-75508 A 3/2002

* cited by examiner

*Primary Examiner* — Ross N Gushi
(74) *Attorney, Agent, or Firm* — KENEALY VAIDYA LLP

(57) ABSTRACT

There is provided a connector including: a sacrificial pressing surface that is provided in a second housing and is a flat surface formed at an end portion on a side opposite in an insertion direction of the second housing. When an external force acts on the second housing in a temporarily assembled state in which the second housing is more shallowly fitted to a first housing than in a fully assembled state and a locking portion is not locked to a locked portion, the sacrificial pressing surface is configured to cause a pressing force to act in a direction in which a contact area of the locked portion with respect to the locking portion is larger than that in a case in which the second housing is pressed in the insertion direction.

5 Claims, 10 Drawing Sheets

CONNECTOR

This application is based on and claims priority under 35 USC 119 from Japanese Patent Application No. 2021-072252 filed on Apr. 22, 2021, the contents of which are incorporated herein by reference.

TECHNICAL FIELD

The present disclosure relates to a connector.

BACKGROUND ART

As a related art, JP2001-357923A describes a connector.

As shown in FIG. 10, a connector 100 includes a first housing 101 that accommodates a terminal fitting (not shown), and a second housing 102 that is fittable to the first housing 101 and restricts detachment of the terminal fitting accommodated in the first housing 101.

That is, in the connector 100, an engagement protrusion 101*a* formed in the first housing 101 is engaged with a guide groove 103 formed in the second housing 102, and the engagement protrusion 101*a* slides from one end side to the other end side of the guide groove 103, whereby the second housing 102 is fitted into a recess 101*b* formed in the first housing 101 to restrict movement of the terminal fitting in an insertion direction.

Here, the guide groove 103 is configured such that an inclination angle with respect to a horizontal plane changes in two stages from one end side toward the other end side, and includes a first inclined portion 103*a* that is provided on a front side in the insertion direction of the second housing 102 and has a relatively large inclination angle, and a second inclined portion 103*b* that is provided on a back side in the insertion direction of the second housing 102 and has a relatively small inclination angle.

That is, in the first inclined portion 103*a*, a state (hereinafter, referred to as a "temporarily assembled state") in which the second housing 102 is shallowly fitted to the recess 101*b*, and the detachment of the terminal fitting is not restricted is configured. On the other hand, in the second inclined portion 103*b*, a state (hereinafter, referred to as a "fully assembled state") in which the second housing 102 is deeply fitted into the recess 101*b* to restrict the detachment of the terminal fitting is configured.

However, in a case of the connector in the related art, for example, when interference between the connectors 100 occurs during conveyance of the connectors 100, and an external force acts on the second housing 102, the second housing 102 is pushed into the recess 101*b*, and the fully assembled state may be unintentionally configured.

In this case, since the terminal fitting cannot be inserted into the first housing 101 in the fully assembled state, it is necessary to insert the terminal fitting into the first housing 101 after returning to the temporarily assembled state by pulling out the second housing 102 so as to slide the engagement protrusion 101*a* from the second inclined portion 103*b* to the first inclined portion 103*a* along the guide groove 103.

As described above, in the connector of the related art, since the fully assembled state is unintentionally configured during the conveyance of the connectors 100, a complicated assembly work of the terminal fitting is forced at a conveyance destination of the connector 100, and there is still room for improvement.

SUMMARY OF INVENTION

The present disclosure provides a connector capable of preventing a fully assembled state of a second housing with respect to a first housing from being configured even when an external force acts on the second housing during conveyance of the connector in a temporarily assembled state.

According to an illustrative aspect of the present disclosure, a connector includes: a first housing that accommodates a terminal fitting; a second housing that is inserted into the first housing to be fitted to the first housing and restricts detachment of the terminal fitting accommodated in the first housing; a locked portion provided on the second housing; a locking portion that is provided flexibly and deformably in the first housing and fits with the locked portion to move over the locked portion by becoming deformably bent along with the first housing and the second housing being fitted with each other, so as to configure a fully assembled state in which the detachment of the terminal fitting is restricted; and a sacrificial pressing surface that is provided in the second housing and is a flat surface formed at an end portion on a side opposite in an insertion direction of the second housing. When an external force acts on the second housing in a temporarily assembled state in which the second housing is more shallowly fitted to the first housing than in the fully assembled state and the locking portion is not locked to the locked portion, the sacrificial pressing surface is configured to cause a pressing force to act in a direction in Which a contact area of the locked portion with respect to the locking portion is larger than that in a case in which the second housing is pressed in the insertion direction.

DESCRIPTION OF EMBODIMENTS

Hereinafter, embodiments of a connector according to the present disclosure will be described in detail with reference to the drawings.

First Embodiment (Configuration of Connector)

Figure 3:
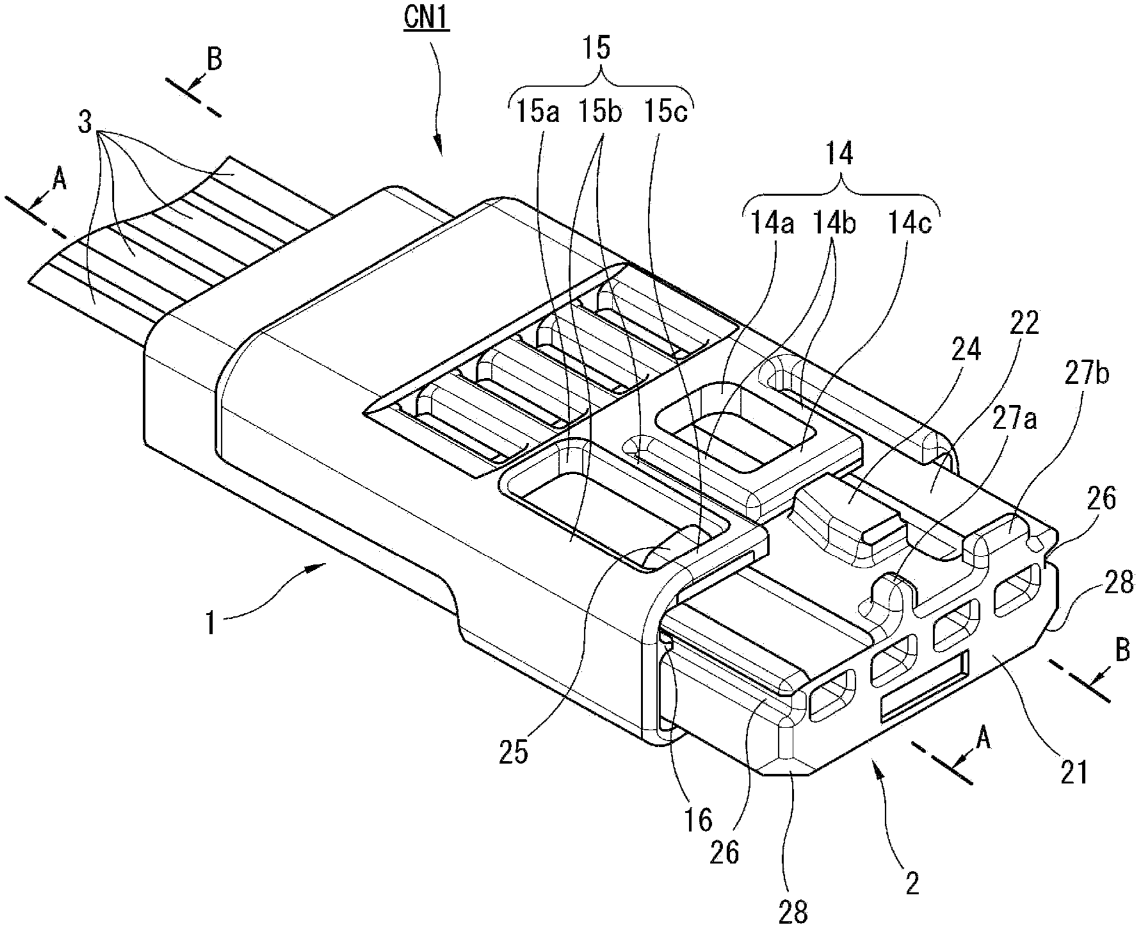
FIG. 3 shows the first embodiment of the connector according to the present disclosure, and is a perspective view showing a temporarily assembled state of the first housing and the second housing shown in FIG. 1.
Figure 4:
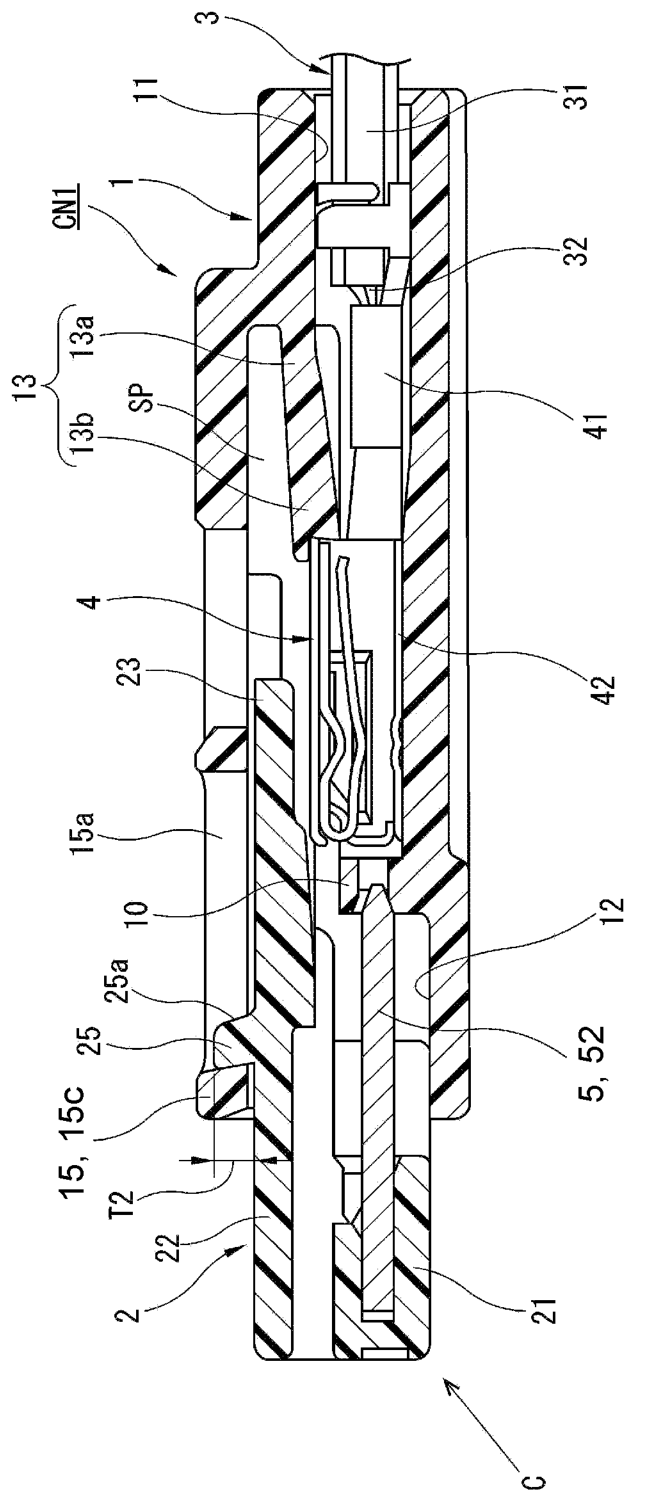
FIG. 4 is a cross-sectional view taken along a line A-A of FIG. 3.
Figure 5:
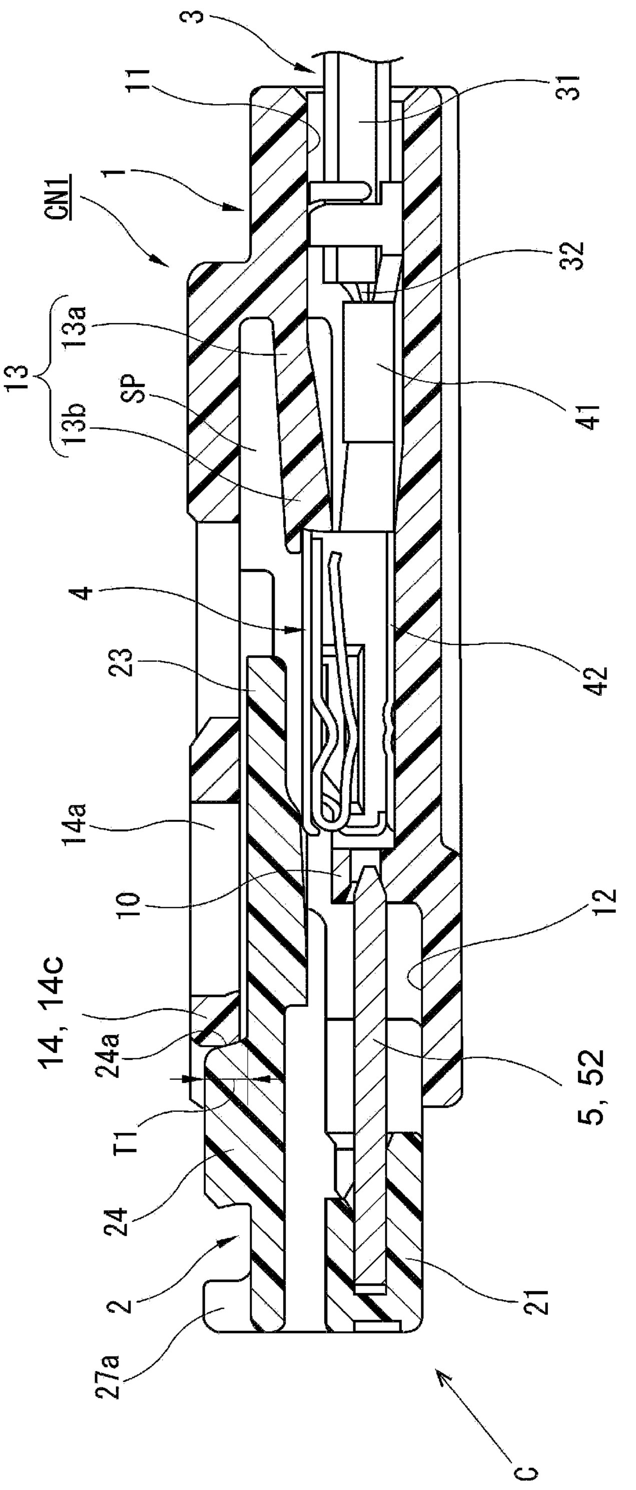
FIG. 5 is a cross-sectional view taken along a line B-B of FIG. 3.

A specific configuration of the connector according to the present embodiment will be described in detail with reference to FIGS. 1 to 7. In description of the drawings, for the sake of convenience, a side of a first housing 1 facing a second housing 2 is defined as "front", and a side opposite to the front is defined as "rear". Meanwhile, a side of the second housing 2 facing the first housing 1 is defined as "front", and a side opposite to the front is defined as "rear". Further, a direction corresponding to an upper side of a paper surface in FIGS. 4 to 6 is defined as "upper", and a direction corresponding to a lower side of the paper surface is defined as "lower".

Figure 1:
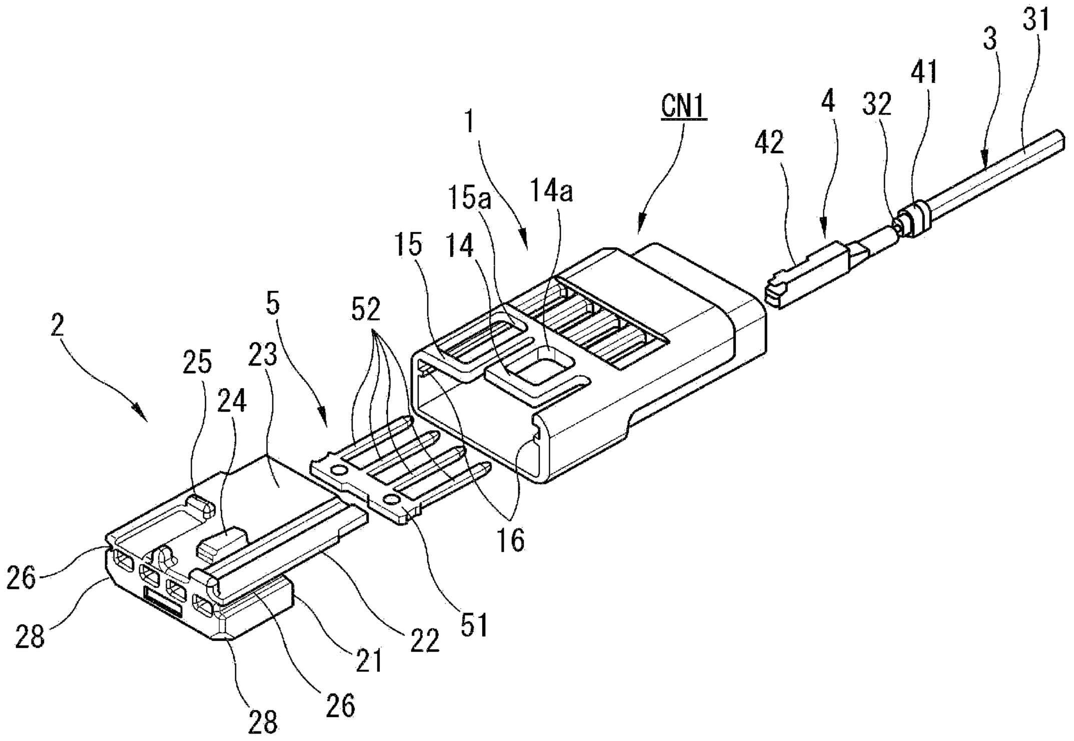
FIG. 1 is an exploded perspective view of a connector according to a first embodiment of the present disclosure.
Figure 6:
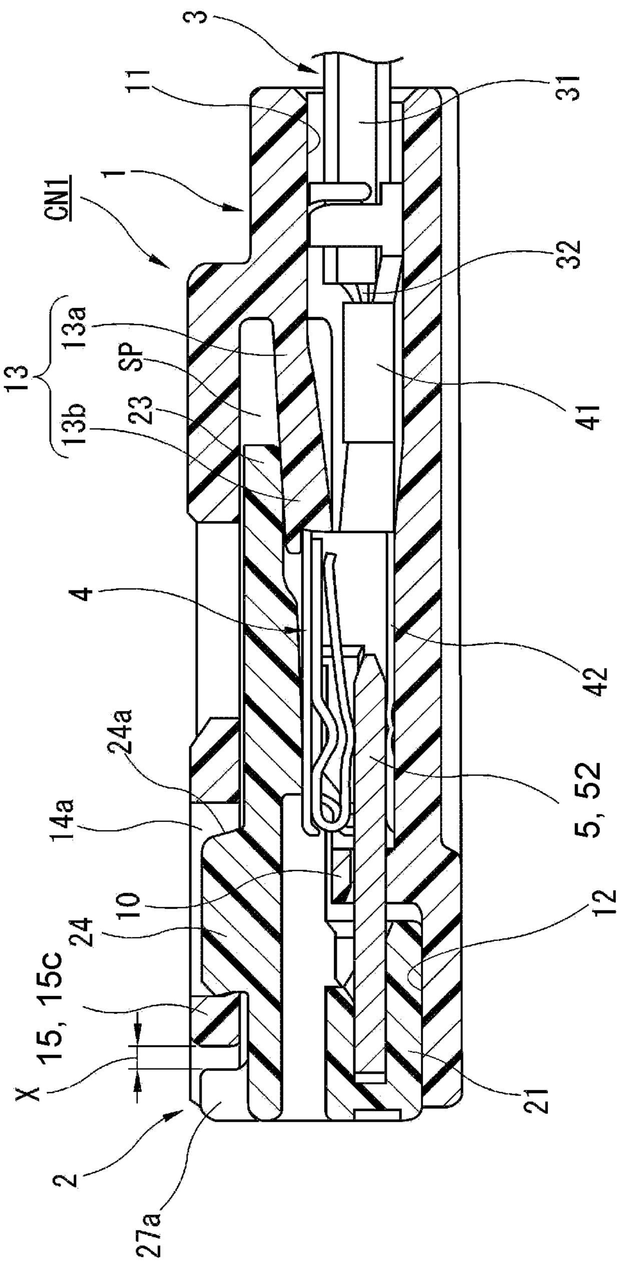
FIG. 6 is a longitudinal sectional view of the connector showing a fully assembled state of the first housing and the second housing shown in FIG. 1.

For example, as shown in FIGS. 1 and 6, a connector CN1 includes the first housing 1 including a plurality of (four in the present embodiment) female terminal accommodating portions 11 for accommodating female terminals 4 severing as terminal fittings connected (caulked and fixed) to electric wires 3, and the second housing 2 that accommodates a bus bar 5 including a plurality of (four in the present embodiment) male terminals 52 respectively fittable to the female terminals 4 and is provided so as to be fittable to the first housing 1. In other words, the connector CN1 exemplified in the present embodiment is a so-called "joint connector" in which the plurality of female terminals 4 are electrically connected to each other via the bus bar 5.

The first housing 1 is formed of a synthetic resin material having an insulating property in a substantially rectangular tube shape, and is provided with the female terminal accommodating portions 11 that accommodates the female terminals 4 on a rear end side and a second housing receiving portion 12 that receives the fitted second housing 2 on a front end side. More specifically, the first housing 1 is provided with a vertically extending partition wall 10 at an intermediate portion in a front-rear direction, the female terminal accommodating portions 11 are defined behind the partition wall 10, and the second housing receiving portion 12 is defined in front of the partition wall 10.

The female terminal accommodating portions 11 are defined so as to have a substantially rectangular shape in a cross section capable of accommodating the female terminals 4 having a rectangular tube shape to be described later, and in the present embodiment, the four female terminal accommodating portions 11 are arranged in parallel in a width direction of the first housing 1. Meanwhile, the second housing receiving portion 12 has a recessed shape corresponding to the second housing 2 to be received, and is integrally; formed across the whole first housing 1 in the width direction.

As shown in FIGS. 4 to 6, a lance portion 13 used for preventing the female terminals 4 from coming off by being locked to the female terminals 4 is provided on an upper portion of the first housing 1 configuring each of the female terminal accommodating portions 11, The lance portion 13 is formed in a cantilever shape extending from the rear to the front, is provided to be flexible and deformable in an up-down direction with a base end portion 13*a* as a fulcrum, and a distal end portion 13*b* can be locked to rear end edges of terminal connection portions 42 (to be described later) of the female terminals 4.

More specifically, for example, as shown in FIGS. 4 and 5, when the female terminals 4 are inserted, the lance portion 13 is elastically deformed so as to be pushed away upward, and then elastically returns to be locked to the rear end edges of the terminal connection portions 42 (to be described later) of the female terminals 4, thereby restricting rearward movement of the female terminals 4. As shown in FIG. 6, when the second housing 2 is completely fitted to the first housing 1, upward movement (bending deformation) of the lance portion 13 is restricted by a lance restricting portion 23 (to be described later) of the second housing 2, and the female terminals 4 are prevented from coming off.

Further, a full locking portion (corresponding to a locking portion according to the present disclosure) 14 used for configuring a fully assembled state (see FIG. 6) of the first housing 1 and the second housing 2 is formed on one side of an upper portion of the first housing 1 in the in the width direction configuring the second housing receiving portion 12. In the fully assembled state, the first housing 1 and the second housing 2 are deeply fitted to each other, and the second housing 2 (lance restricting portion 23 to be described later) restricts bending deformation of the lance portion 13, thereby preventing the female terminals 4 from coming off. As shown in FIGS. 1 and 3, the full locking portion 14 has a substantially rectangular frame shape that defines a full locking opening 14*a*, and includes a pair of cantilever-shaped full locking arm portions 14*b* and 14*b* parallel to each other and linearly extending forward, and a full locking piece 14*c* that is provided to connect distal end portions of the pair of full locking arm portions 14*b* and 14*b* to each other and can be locked to a full locking protrusion 24 (to be described later) of the second housing 2.

That is, as shown in FIG. 5, when the second housing 2 is to be fitted to the first housing 1, the pair of full locking arm portions 14*b* and 14*b* of the full locking portion 14 are bent and deformed upward to cause the full locking piece 14*c* to move over the full locking protrusion 24 (to be described later) of the second housing 2 to be locked to a rear end portion of the full locking protrusion 24, whereby the full assembled state in which the first housing 1 and the second housing 2 are deeply fitted to each other, and the female terminals 4 are prevented from coming off by the lance restricting portion 23 (to be described later) is maintained.

A temporary locking portion 15 used for configuring a temporarily assembled state (see FIG. 4) of the first housing 1 and the second housing 2 is formed on the other side of the upper portion of the first housing 1 in the width direction configuring the second housing receiving portion 12. In the temporarily assembled state, the first housing 1 and the second housing 2 are more shallowly fitted to each other than in the fully assembled stale, and the second housing 2 (lance restricting portion 23 to be described later) does not restrict the bending deformation of the lance portion 13, thereby not preventing the female terminals 4 from coming off. As shown in FIGS. 1 and 3, the temporary locking portion 15 has a substantially rectangular frame shape that defines a long hole-shaped temporary locking opening 15*a* extending in the front-rear direction, and includes a pair of cantilever-shaped temporary locking arm portions 15*b* and 15*b* parallel to each other and linearly extending forward, and a temporary locking piece 15*c* that is provided to connect distal end portions of the pair of temporary locking arm portions 15*b* and 15*b* to each other and can be locked to a temporary locking protrusion 25 (to be described later) of the second housing 2.

That is, as shown in FIG. 4, when the second housing 2 is to be fitted to the first housing 1, the pair of temporary locking arm portions 15*b* and 15*b* of the temporary locking portion 15 are bent and deformed upward to cause the temporary locking piece 15*c* to move over the temporary locking protrusion 25 (to be described later) of the second housing 2 to be locked to a rear end portion of the temporary locking protrusion 25, whereby the temporarily assembled state in which the first housing 1 and the second housing 2 are fitted to each other shallower than in the fully assembled state, and the female terminals 4 are not prevented from coming off by the lance restricting portion 23 (to be described later) is maintained.

In this temporarily assembled state, as shown in FIG. 4, the temporary locking piece 15*c* is locked to the rear end portion of the temporary locking protrusion 25 immediately moving over the temporary locking protrusion 25 (to be described later) of the second housing 2, thereby preventing the second housing 2 from coming off from the first housing 1, while as shown in FIG. 5, the full locking piece 14*c* is in contact with a front end portion of the full locking protrusion 24 immediately before moving over the full locking protrusion 24 (to be described later) of the second housing 2, thereby not preventing the female terminals 4 from coming off by the lance restricting portion 23 to be described later.

The second housing 2 is integrally formed of a synthetic resin material having an insulating property, and includes, for example, as shown in FIGS. 1 and 6, a bus bar holding portion 21 that accommodates and holds a base portion 51 of the bus bar 5, a rectangular plate-shaped top plate portion 22 that is connected to an upper portion of the bus bar holding portion 21 and extends forward in parallel with the male terminals 52 of the bus bar 5, the lance restricting portion 23 that is formed in a tapered shape at a distal end portion (front end portion) of the top plate portion 22 and restricts the bending deformation of the lance portion 13 of the first housing 1, and a full locking protrusion (corresponding to a locked portion according to the present disclosure) 24 and a temporary locking protrusion (corresponding to a temporarily locked portion according to the present disclosure) 25 that are provided in parallel in the width direction on an upper surface of the top plate portion 22.

Figure 2:
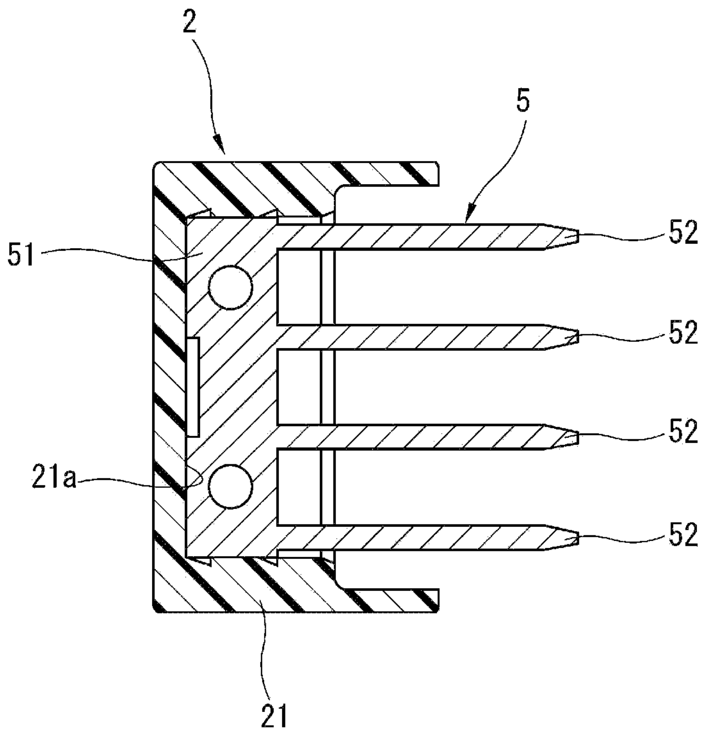
FIG. 2 is a longitudinal sectional view showing an assembled state of a second housing and a bus bar shown in FIG. 1.

As shown in FIG. 2, the bus bar holding portion 21 has a recess 21*a* having a substantially rectangular cross section and opening forward, and the base portion 51 of the bus bar 5 is press-fitted into the recess 21*a*, whereby the bus bar 5 is accommodated and held in a state where distal end sides of the male terminals 52 face an outside (forward).

As shown in FIGS. 4 to 6, the top plate portion 22 linearly extends forward to the vicinity of the distal ends of the male terminals 52 so as to cover an upper side of the bus bar 5. As shown in FIGS. 1 and 3, a pair of guide grooves 26 for guiding the second housing 2 to be fitted into the first housing 1 are formed between the top plate portion 22 and the bus bar holding portion 21 on both side portions of the second housing 2. The pair of guide grooves 26 are engaged with a pair of linear guides 16 formed on both side portions of the second housing receiving portion 12 to guide the second housing 2 to be fitted into the first housing 1.

The lance restricting portion 23 is inserted into a lance deformation space SP for receiving upward deformation of the lance portion 13 of the first housing 1 in the fully assembled state in which the full locking protrusion 24 is locked to the full locking portion 14. That is, in this fully assembled state, the lance restricting portion 23 inserted into the lance deformation space SP comes into contact with an upper portion of the lance portion 13 to restrict the bending deformation of the lance portion 13. Accordingly, the state in which the lance portion 13 is locked to the rear end edges of the terminal connection portions 42 of the female terminals 4 is maintained, and the female terminals 4 are prevented from coming off.

The lance restricting portion 23 is allowed to enter the lance deformation space SP only in a state where the lance portion 13 is locked to the rear end edges of the terminal connection portions 42 of the female terminals 4, that is, in a state where the lance portion 13 is not deformed upward. In other words, when the insertion of the female terminals 4 into the first housing 1 is insufficient, the lance portion 13 moves on the terminal connection portions 42 of the female terminals 4, and the lance restricting portion 23 interferes with the lance portion 13 to restrict entry into the lance deformation space SP. With this configuration, the lance restricting portion 23 has a function of detecting the insufficient insertion of the female terminals 4, and proper insertion of the female terminals 4 into the first housing 1 is ensured in the fully assembled state in which the lance restricting portion 23 enters the lance deformation space SP and can restrict the bending deformation of the lance portion 13.

As shown in FIGS. 1 and 3, the full locking protrusion 24 has a substantially rectangular block shape and is formed integrally with the top plate portion 22. As shown in FIGS. 5 and 6, a front end portion of the full locking protrusion 24 is formed with a full locking tapered portion 24*a* configuring an inclined surface (tapered surface) in which a height dimension T1 of the full locking protrusion 24 gradually decreases toward the front. By the full locking tapered portion 24*a*, the full locking portion 14 (full locking piece 14*c*) is relatively easily lifted along the full locking tapered portion 24*a*, and the full locking portion 14 can be easily locked to the full locking protrusion 24 with a relatively small pressing force.

As shown in FIGS. 1 and 3, the temporary locking protrusion 25 has a substantially rectangular piece shape and is formed integrally with the top plate portion 22. Further, as shown in FIG. 4, a front end portion of the temporary locking protrusion 25 is formed with a temporary locking tapered portion 25*a* configuring an inclined surface (tapered surface) in which a height dimension T2 of the temporary locking protrusion 25 gradually decreases toward the front. By the temporary locking tapered portion 25*a*, the temporary locking portion 15 (temporary locking piece 15*c*) is relatively easily lifted along the temporary locking tapered portion 25*a*, and the temporary locking portion 15 can be easily locked to the temporary locking protrusion 25 with a relatively small pressing force.

A first protrusion portion 27*a* and a second protrusion portion 27*b* severing as a pair of protrusions are provided on a rear end edge of the top plate portion 22 at positions facing corners on both sides in the width direction of the full locking portion 14 in the insertion direction of the second housing 2. The first protrusion portion 27*a* and the second protrusion portion 27*b* are disposed outside the full locking protrusion 24 in the width direction of the second housing 2 and spaced apart from each other so as to be close to the full locking portion 14 with relatively small gaps X (see FIG. 6) therebetween in the fully assembled state, and are set to have the same height as the full locking portion 14 (full locking piece 14*c*). That is, the first protrusion portion 27*a*, and the second protrusion portion 27*b* are disposed so as to be close to and face both side portions of the distal end of the full locking portion 14 (both end, portions of the full locking piece 14*c*), thereby preventing an external force (can generate a lifting action of the full locking portion 14) acting on an outside of the second housing 2 from directly acting on both side portions of the distal end of the full locking portion 14 (in particular, lower end edges of both side portions of the distal end of the full locking portion 14).

Figure 7:
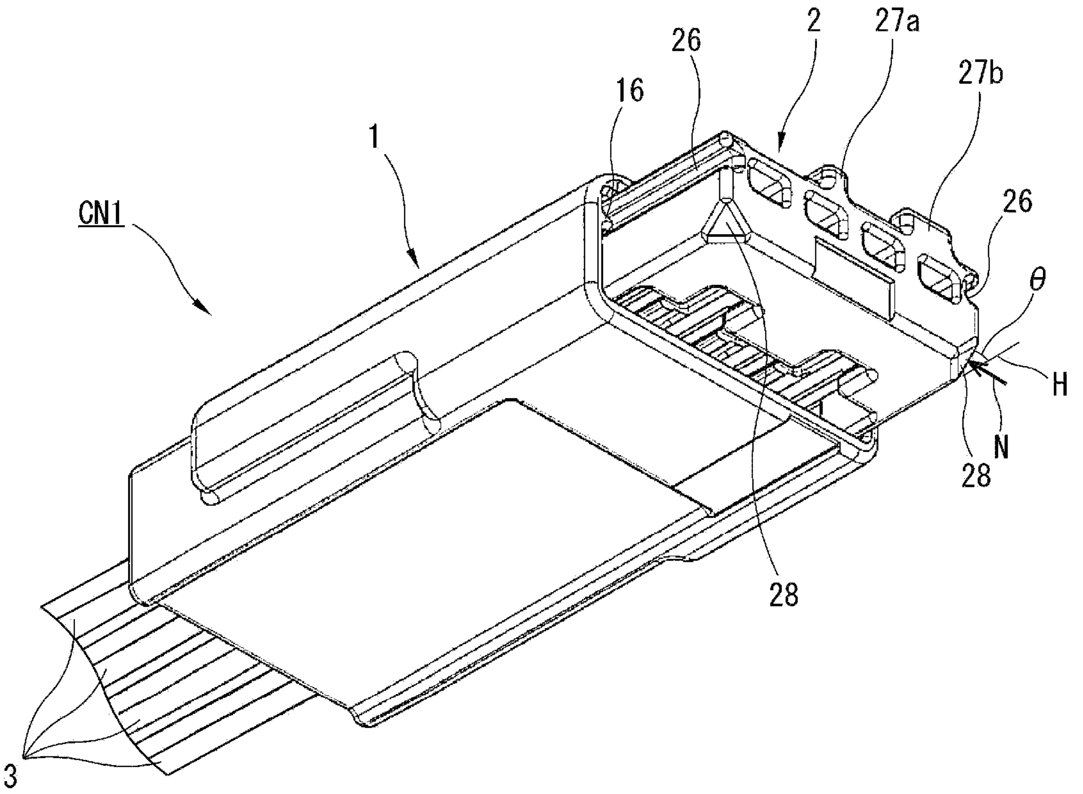
FIG. 7 is a view as viewed in a direction indicated by an arrow C in FIG. 4.

As shown in FIG. 7, the second housing 2 is formed with sacrificial pressing surfaces 28 used to prevent unintended full assembly of the first housing 1 and the second housing 2 due to an external force generated when the connector CN1 is conveyed in the temporarily assembled state. The sacrificial pressing surfaces 28 are disposed at rear end portions of the second housing 2. The rear end portions are positions at which the external force acting on the connector CN1 promotes the configuration of the fully assembled state by a principle of leverage, and are far from the full locking protrusion 24 that is a point of action of the external force in the insertion direction of the second housing 2, and are end portions on a side opposite to the full locking protrusion 24 in the insertion direction of the second housing 2.

Each of the sacrificial pressing surfaces 28 has a normal vector N that is not orthogonal to the insertion direction of the second housing 2, and is configured by a flat surface in which a pressing force is generated in a direction in which a contact area of the full locking protrusion 24 with respect to the full locking portion 14 (full locking piece 14*c*) increases in compared to a case of pressing the second housing 2 in the insertion direction. Specifically, in the present embodiment, the second housing 2 is configured by a pair of flat surfaces formed by chamfering corner portions on both sides of a lower end portion of the second housing 2. The present embodiment discloses that, for example, minor angles θ of angles formed between the sacrificial pressing surfaces 28 and a horizontal plane H along the insertion direction of the second housing 2 are set to 45°, and the minor angles θ of the angles formed between the sacrificial pressing surfaces 28 and the horizontal plane H are preferably set to 45° or less.

The female terminals 4 are integrally formed of a predetermined conductive metal material, and include electric wire connecting portions 41 that are crimped to exposed core wire portions 32 obtained by removing a part of covering portions 31 at distal end portions of the electric wires 3, and the terminal connection portions 42 having a substantially rectangular tube shape that are integrally provided on distal end sides of the electric wire connecting portions 41 and fitted to the male terminals 52 to be connected to the male terminals 52.

The bus bar 5 is integrally formed by punching out a conductive metal plate, and particularly, as shown in FIGS. 1 and 2, includes the base portion 51 that is formed in a band shape over the width direction and is press-fitted and held in the bus bar holding portion 21 of the second housing 2, and the plurality of (four in the present embodiment) male terminals 52 that extend in parallel to each other from a front end portion of the base portion 51.

(Functions and Effects of Present Embodiment)

Hereinafter, functions and effects of the connector CN1 according to the present embodiment will be specifically described.

Figure 10:
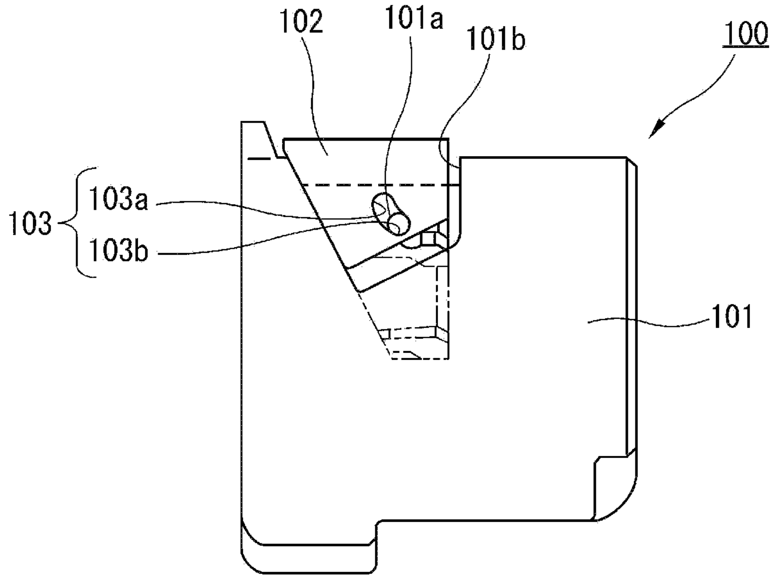
FIG. 10 is a side view of a connector in the related art.

In a case of the connector in the related art, as shown in FIG. 10, when an external force acts on the second housing 102 during conveyance of the connector 100, the second housing 102 is pushed into the recess 101*b*, and the fully assembled state of the first housing 101 and the second housing 102 may be unintentionally configured. Accordingly, a complicated assembling operation of the terminal fitting, such as inserting the terminal fitting (not shown) into the first housing 101 after the second housing 102 is pulled out and returned to the temporarily assembled state at the conveyance destination of the connector 100, is forced, and there is still room for improvement.

In contrast, according to the connector CN1 of the present embodiment, in the second housing 2, the flat surface-shaped sacrificial pressing surfaces 28 are provided at the end portions on the side opposite to the full locking protrusion 24 in the insertion direction of the second housing 2, which are the portions where a large pressing force is easily generated in the insertion direction of the second housing 2 with respect to the second housing 2 by the principle of leverage, so as to apply the pressing force in the direction in which the contact area of the full locking protrusion 24 with respect to the full locking portion 14 (full locking piece 14*c*) increases as compared to the case of pressing the second housing 2 along the insertion direction.

With such a configuration, when the external force acts on the second housing 2 during the conveyance of the connector CN1 in the temporarily assembled state, the sacrificial pressing surfaces 28 receive the external force particularly at the rear end portion of the second housing 2 where a large pressing force is easily generated in the insertion direction of the second housing 2 with respect to the second housing 2 by the principle of leverage. Therefore, the external force acting on the sacrificial pressing surfaces 28 causes the pressing force to act in the direction in which the contact area of the full locking protrusion 24 with respect to the full locking portion 14 (full locking piece 14*c*) increases based on a vertical component of the normal vectors N, and it is possible to make it difficult for the full locking portion 14 (full locking piece 14*c*) to move over the full locking protrusion 24. As a result, it is possible to prevent a problem that the fully assembled state of the first housing 1 and the second housing 2 is unintentionally configured by the external force acting on the second housing 2 during the conveyance of the connector CN1 in the temporarily assembled state.

In the present embodiment, the sacrificial pressing surfaces 28 are configured by the pair of flat surfaces formed at the corner portions on both sides of the lower end portion of the rear end portion of the second housing 2.

In this way, the sacrificial pressing surfaces 28 are provided at the corner portions on both sides in the width direction of the second housing 2, which are relatively easily subjected to the external force and are located relatively far from the full locking protrusion 24, whereby it is possible to more effectively prevent the problem that the fully assembled state of the first housing 1 and the second housing 2 is unintentionally configured by the external force applied to the second housing 2.

Further, by providing the sacrificial pressing surfaces 28 at the corner portions on both sides of the lower end portion of the rear end portion of the second housing 2, there is an advantage that an effect of the sacrificial pressing surfaces 28 on an outer shape of the second housing 2 can be made relatively small, and the sacrificial pressing surfaces 28 are not easily restricted by the outer shape of the second housing 2.

Even when the pair of sacrificial pressing surfaces 28 are the corner portions on both sides of the rear end portion of the second housing 2, when the pair of sacrificial pressing surfaces 28 are provided at corner portions on both sides of an upper end portion opposite to the present embodiment, the external force acting on the sacrificial pressing surfaces 28 acts in a direction in which the contact area of the full locking protrusion 24 with respect to the full locking portion 14 (full locking piece 14*c*) decreases, and the full locking portion 14 (full locking piece 14*c*) easily moves over the full locking protrusion 24, which is not appropriate.

In the present embodiment, the minor angles θ of the angles formed between the sacrificial pressing surfaces 28 and the horizontal plane H along the insertion direction of the second housing 2 is set to 45° or less.

In this way, since the minor angles θ of the angles formed between the sacrificial pressing surfaces 28 and the horizontal plane H along the insertion direction of the second housing 2 is set to 45° or less, the external force acting on the sacrificial pressing surfaces 28 acts in the direction in which the contact area of the full locking protrusion 24 with respect to the full locking portion 14 (full locking piece 14*c*) increases relatively greatly. As a result, it is possible to more effectively prevent the problem that the fully assembled state of the first housing 1 and the second housing 2 is unintentionally configured by the external force acting on the second housing 2.

Further, in the present embodiment, by providing the temporary locking portion 15 (temporary locking piece 15*c*) and the temporary locking protrusion 25 configuring the temporarily assembled state of the first housing 1 and the second housing 2, it is possible to maintain the certain temporarily assembled state of the first housing 1 and the second housing 2 at the time of conveying the connector CN1. Accordingly, the connector CN1 can be satisfactorily conveyed, the first housing 1 and the second housing 2 can be quickly put into the fully assembled state at the conveyance destination, and workability related to a fully assembled work can be improved.

In the present embodiment, the full locking tapered portion 24*a* is formed at the front end portion of the full locking protrusion 24 so as to be inclined such that the height dimension of the full locking protrusion 24 gradually decreases toward the front.

In this way, since the full locking tapered portion 24*a* inclined such that the height dimension T1 of the full locking protrusion 24 gradually decreases toward the front is provided, the vertical component of the external force acting on the sacrificial pressing surfaces 28 acts such that the rear end portion of the second housing 2 is lifted up and the full locking protrusion 24 rises forward. Accordingly, the full locking tapered portion 24*a* and the full locking portion 14 (full locking piece 14*c*) approach parallel to each other, and the contact area of the full locking tapered portion 24*a* with respect to the full locking portion 14 (full locking piece 14*c*) increases. As a result, it is more difficult for the full locking portion 14 (full locking piece 14*c*) to move over the full locking protrusion 24, and it is possible to more effectively prevent the problem that the fully assembled state of the first housing 1 and the second housing 2 is unintentionally configured by the external force acting on the second housing 2 during the conveyance of the connector CTI in the temporarily assembled state.

Second Embodiment

Figure 8:
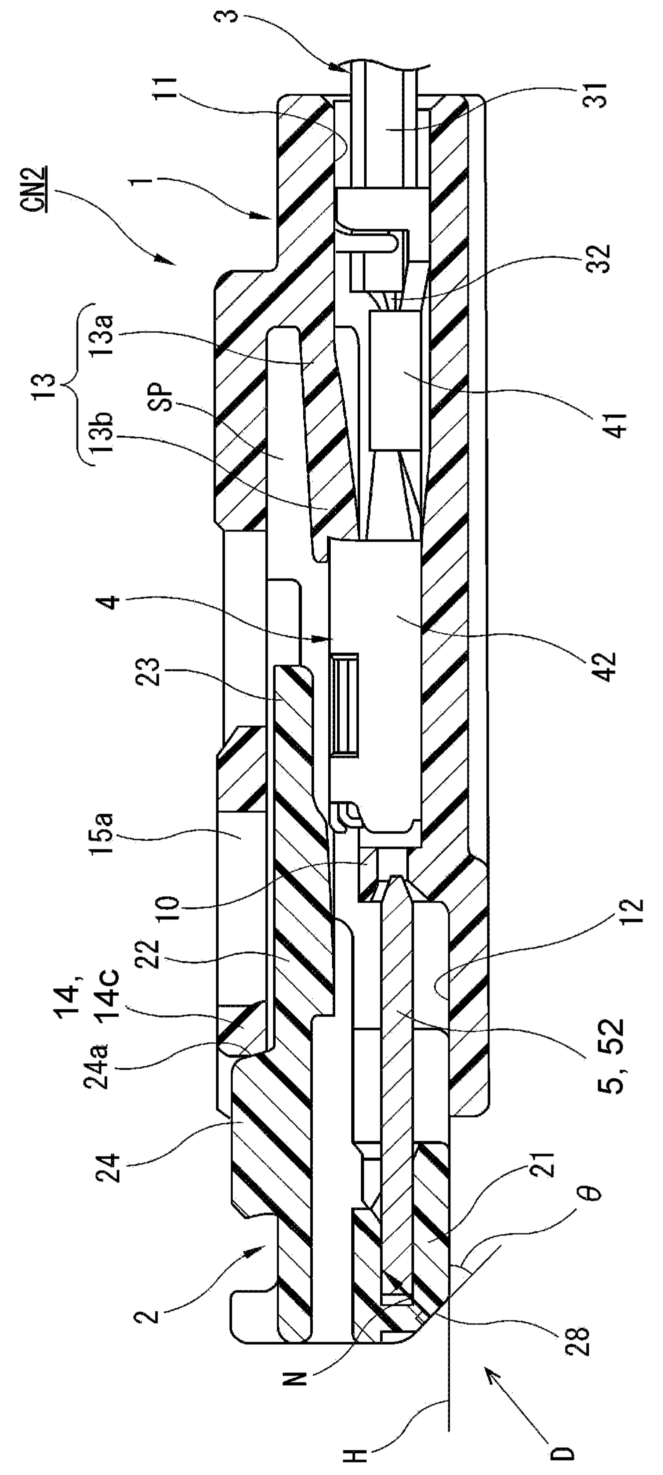
FIG. 8 shows a second embodiment of a connector according to the present disclosure, and is a longitudinal sectional view of the connector cut along an insertion direction of a second housing so as to pass through a full locking portion and a full locking protrusion in a temporarily assembled state of a first housing and the second housing.
Figure 9:
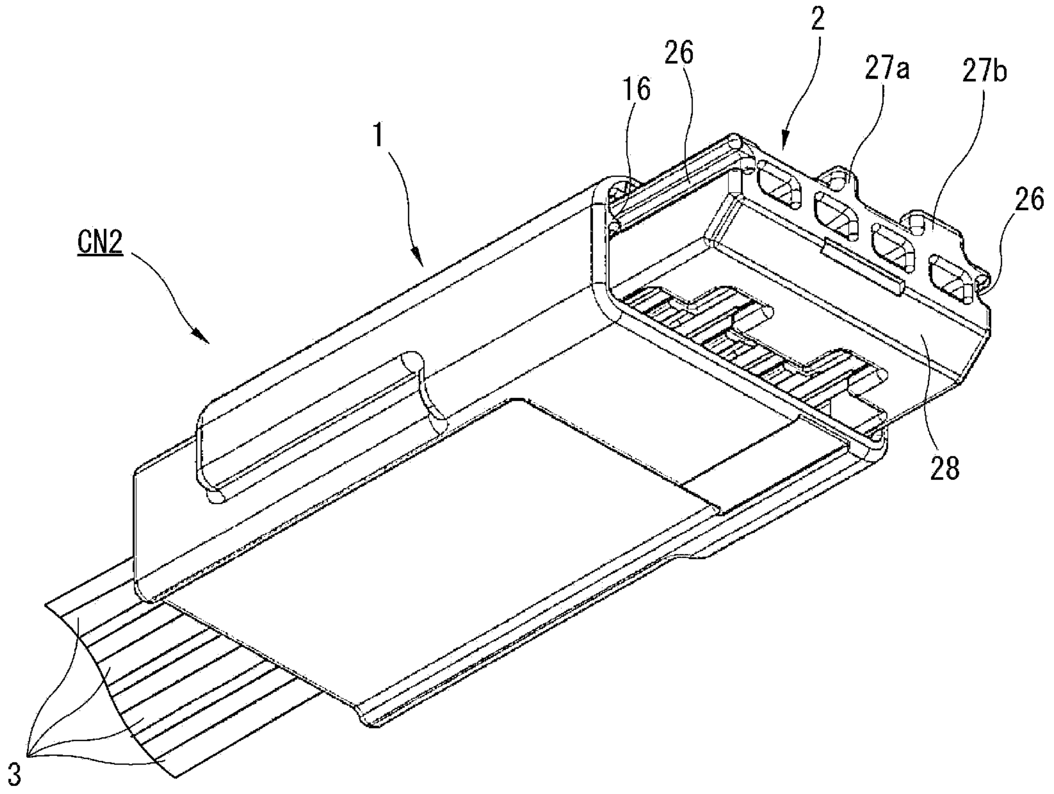
FIG. 9 is a view as viewed in a direction indicated by an arrow D in FIG. 8.

FIGS. 8 and 9 show a second embodiment of a connector according to the present disclosure. In the present embodiment, a configuration of a sacrificial pressing surface 28 according to the first embodiment is changed, and the other configurations are the same as those of the first embodiment. Therefore, the same components as those of the first embodiment are denoted by the same reference numerals, and description thereof will be omitted.

As shown in FIGS. 8 and 9, in a connector CN2 according to the present embodiment, the sacrificial pressing surface 28 is provided continuously over one side of a lower end edge of a rear end portion of the second housing 2 so as to extend along a width direction of the second housing 2, instead of being provided at corner portions on both sides of a lower end portion of the rear end portion of the second housing 2. In other words, in the connector CN2 according to the present embodiment, the lower end edge of the rear end portion of the second housing 2 is chamfered along the width direction to form the whole sacrificial pressing surface 28 continuous along the width direction of the second housing 2.

As described above, the sacrificial pressing surface 28 is continuously provided over a relatively wide range on the entire side extending along the width direction of the second housing 2 at the lower end edge of the rear end portion of the second housing 2, and thus an external force is easily applied to the sacrificial pressing surface 28 by an increase in an area of the sacrificial pressing surface 28. Therefore, it is possible to more effectively prevent a problem that a fully assembled state of the first housing 1 and the second housing 2 is unintentionally configured by the external force acting on the second housing 2 during conveyance of the connector CN2 in a temporarily assembled state.

The present disclosure is not limited to the configurations described in the respective embodiments, and can be freely changed in accordance with the specification of an application object and the like without departing from the gist of the present disclosure.

In particular, each of the above embodiments describes, for example, a mode in which the full locking portion 14 and the temporary locking portion 15 are provided in the first housing 1 and the full locking protrusion 24 and the temporary locking protrusion 25 are provided on the second housing 2 *e*, whereas the full locking protrusion 24 and the tetnporary locking protrusion 25 may be provided on the first housing 1 and the full locking portion 14 and the temporary locking portion 15 may be provided in the second housing 2. That is, even when the full locking portion 14 and the temporary locking portion 15 and the full locking protrusion 24 and the temporary locking protrusion 25 are con figured to be opposite to those in the above-described embodiments, the contact area between the full locking portion 14 and the full locking protrusion 24 increases by the external force acting on the sacrificial pressing surface 28. Accordingly, it is possible to prevent the problem that the fully assembled state of the first housing 1 and the second housing 2 is unintentionally configured by the external force acting on the second housing 2.

According to a first aspect of the present disclosure, a connector (CN1, CN2) includes: a first housing (1) that accommodates a terminal fitting (4); a second housing (2) that is inserted into the first housing (1) to be fitted to the first housing (1) and restricts detachment of the terminal fitting (4) accommodated in the first housing (1); a locked portion (24) provided on the second housing (2); a locking portion (14) that is provided flexibly and deformably in the first housing (1) and fits with the locked portion (24) to move over the locked portion (24) by becoming deformably bent along with the first housing (1) and the second housing (2) being fitted with each other, so as to configure a fully assembled state in which the detachment of the terminal fitting (4) is restricted; and a sacrificial pressing surface (28) that is provided in the second housing (2) and is a flat surface formed at an end portion on a side opposite in an insertion direction of the second housing (2). When an external force acts on the second housing (2) in a temporarily assembled state in which the second housing (2) is more shallowly fitted to the first housing (1) than in the fully assembled state and the locking portion (14) is not locked to the locked portion (24), the sacrificial pressing surface (28) is configured to cause a pressing force to act in a direction in which a contact area of the locked portion (24) with respect to the locking portion (14) is larger than that in a case in which the second housing (2) is pressed in the insertion direction.

According to the first aspect, in the second housing, the flat surface-shaped sacrificial pressing surface is provided at the end portions on the side opposite to the locked portion in the insertion direction of the second housing, which are the portions where a large pressing force is easily generated in the insertion direction of the second housing with respect to the second housing by a principle of leverage, so as to apply the pressing force in a direction in which a contact area of the locked portion with respect to the locking portion increases as compared to a case of pressing the second housing along the insertion direction thereof.

Therefore, when the external force acts on the second housing during the conveyance of the connector in the temporarily assembled state, the sacrificial pressing surface receives the external force particularly at the rear end portion of the second housing in the insertion direction, where a large pressing force is easily generated in the insertion direction of the second housing with respect to the second housing by the principle of leverage. Accordingly, the external force acting on the sacrificial pressing surface causes a pressing force to act in the direction in which the contact area of the locked portion with respect to the locking portion increases, and the locking portion is less likely to move over the locked portion. Accordingly, it is possible to prevent a problem that the fully assembled state of the first housing and the second housing is unintentionally configured by the external force acting on the second housing during the conveyance of the connector in the temporarily assembled state.

According to a second aspect of the present disclosure, the second housing (2) may be formed such that an end portion of the second housing (2) on a side opposite to the locked portion (24) in the insertion direction has a substantially rectangular shape, and the sacrificial pressing surface (28) may be provided at corner portions on both sides in a width direction of the second housing (2) at the rectangular-shaped end portion.

According to the second aspect, the sacrificial pressing surface is provided at the corner portions on both sides in the width direction of the second housing, which are relatively easily subjected to the external force and are located relatively far from the locked portion, whereby it is possible to more effectively prevent the problem that the fully assembled state of the first housing and the second housing is unintentionally configured by the external force applied to the second housing.

According to a third aspect of the present disclosure, the second housing (2) may be formed such that an end portion of the second housing (2) on a side opposite to the locked portion (24) in the insertion direction has a substantially rectangular shape, and the sacrificial pressing surface (28) may be provided continuously over one side of the rectangular-shaped end portion to extend along a width direction of the second housing (2) at the rectangular-shaped end portion.

According to the third aspect, since the sacrificial pressing surface is provided over a relatively wide range over the entire one side extending in the width direction of the second housing, the external force generated during the conveyance of the connector easily acts on the sacrificial pressing surface. Therefore, it is possible to more effectively prevent the problem that the fully assembled state of the first housing and the second housing is unintentionally configured by the external force acting on the second housing during conveyance of the connector in a temporarily assembled state.

According to a fourth aspect of the present disclosure, the sacrificial pressing surface (28) may be designed such that an angle (θ) formed between the sacrificial pressing surface (28) and a horizontal plane (II) along the insertion direction of the second housing (2) is set to 45 degrees or less.

According to the fourth aspect, since the minor angles of the angles formed between the sacrificial pressing surfaces and the horizontal plane along the insertion direction of the second housing is set to 45° or less, the external force acting on the sacrificial pressing surfaces acts in the direction in which the contact area of the locked portion with respect to the locking portion increases relatively greatly. Accordingly, it is possible to more effectively prevent the problem that the second housing comes into the fully assembled state unintentionally by the external force acting on the second housing.

According to a fifth aspect of the present disclosure, the connector (CN1, CN2) may further include: a temporarily locked portion (25) provided on the second housing (2) and a temporary locking portion (15) that is provided flexibly and deformably in the first housing (1) and fits with the temporarily locked portion (25) to move over the temporarily locked portion (25) by becoming deformably bent along with the first housing (1) and the second housing (2) being fitted with each other, so as to configure the temporarily assembled state in which the locking portion (14) is held in a state immediately before the locking portion (14) is locked to the locked portion (24) while the detachment of the second housing (2) with respect to the first housing (1) is restricted.

According to the fifth aspect, by providing the temporary locking portion and the temporarily locked portion configuring the temporarily assembled state of the first housing and the second housing, it is possible to maintain the certain temporarily assembled state of the first housing and the second housing at the time of conveying the connector. Accordingly, the connector can be satisfactorily conveyed, the first housing and the second housing can be quickly fully-assembled at the conveyance destination, and workability related to the fully assembled work can be improved.

According to the present disclosure, when the external force acts on the second housing during the conveyance of the connector in the temporarily assembled state, the sacrificial pressing surface receives the external force particularly at the rear end portion of the second housing in the insertion direction, where a large pressing force is easily generated in the insertion direction of the second housing with respect to the second housing by the principle of leverage. Accordingly, the external force acting on the sacrificial pressing surface causes a pressing force to act in the direction in which the contact area of the locked portion with respect to the locking portion increases, and the locking portion is less likely to move over the locked portion. Accordingly, it is possible to prevent a problem that the fully assembled state of the first housing and the second housing is unintentionally configured by the external force acting on the second housing during the conveyance of the connector in the temporarily assembled state.

What is claimed is:

1. A connector comprising:

a first housing that accommodates a terminal fitting that extends in an insertion direction;

a second housing that accommodates a terminal that extends in the insertion direction, the second housing is inserted into the first housing in the insertion direction to be fitted to the first housing with the terminal inserted into the terminal fitting in the insertion direction, and the second housing restricts detachment of the terminal fitting accommodated in the first housing in the insertion direction;

a locked portion provided on the second housing;

a locking portion that is provided flexibly and deformably in the first housing and fits with the locked portion to move over the locked portion by becoming deformably bent along with the first housing and the second housing being fitted with each other, so as to configure a fully assembled state in which the detachment of the terminal fitting is restricted; and a sacrificial pressing surface that is provided in the second housing and is a flat surface formed at an end portion spaced away from the first housing in the insertion direction of the second housing, the flat surface is inclined relative to the insertion direction, wherein the locking portion includes a contact surface and the locked portion includes a tapered surface that is inclined relative to the contact surface when the locking portion is deformably bent during insertion of the second housing into the first housing, and when an external force acts on the second housing in a temporarily assembled state in which the second housing is more shallowly fitted to the first housing than in the fully assembled state and the locking portion is not locked to the locked portion, the sacrificial pressing surface is configured to cause a pressing force component of the external force to move the second housing in a direction that intersects the insertion direction and causes the tapered surface and the contact surface to approach parallel to each other such that a contact area of the locked portion with respect to the locking portion is larger than that in a case in which the second housing is pressed in the insertion direction.

2. The connector according to claim 1, wherein the second housing is formed such that an end portion of the second housing on a side opposite to the locked portion in the insertion direction has a substantially rectangular shape, and the sacrificial pressing surface is provided continuously over one side of the rectangular-shaped end portion to extend along a width direction of the second housing at the rectangular-shaped end portion.

3. The connector according to claim 1, further comprising:

a temporarily locked portion provided on the second housing; and a temporary locking portion that is provided flexibly and deformably in the first housing and fits with the temporarily locked portion to move over the temporarily locked portion by becoming deformably bent along with the first housing and the second housing being fitted with each other, so as to configure the temporarily assembled state in which the locking portion is held in a state immediately before the locking portion is locked to the locked portion while the detachment of the second housing with respect to the first housing is restricted.

4. The connector according to claim 1, wherein the second housing is formed such that an end portion of the second housing on a side opposite to the locked portion in the insertion direction has a substantially rectangular shape, and the sacrificial pressing surface is provided at corner portions on both sides in a width direction of the second housing at the rectangular-shaped end portion.

5. The connector according to claim 4, wherein the sacrificial pressing surface is designed such that an angle formed between the sacrificial pressing surface and a horizontal plane along the insertion direction of the second housing is set to 45 degrees or less.

* * * * *